United States Patent [19]

Estrada, Jr.

[11] 4,024,760

[45] May 24, 1977

[54] FLUID FLOW MEASUREMENT APPARATUS

[75] Inventor: Herbert Estrada, Jr., Annapolis, Md.

[73] Assignee: Westinghouse Electric Corporation, Pittsburgh, Pa.

[22] Filed: July 25, 1975

[21] Appl. No.: 599,209

[52] U.S. Cl. .............................................. 73/194 A
[51] Int. Cl.² ......................................... G01F 1/66
[58] Field of Search .................................. 73/194 A

[56] References Cited

UNITED STATES PATENTS

| 3,555,899 | 1/1971 | Yamamoto et al. | 73/194 A |
| 3,564,912 | 2/1971 | Malone et al. | 73/194 A |
| 3,575,050 | 4/1971 | Lynnworth | 73/194 A |
| 3,641,817 | 2/1972 | Dory | 73/194 A |

Primary Examiner—Charles A. Ruehl
Attorney, Agent, or Firm—D. Schron

[57] ABSTRACT

A multi-path acoustic flow measuring system wherein measured parameters from one path are utilized in the calculation process of another path.

10 Claims, 20 Drawing Figures

FLUID FLOW MEASUREMENT APPARATUS

BACKGROUND OF THE INVENTION

1. Field of the Invention:

This invention relates in general to flowmeters, and particularly to an acoustic flowmeter for application where high reverberation may be present.

2. Description of the Prior Art:

Flow measurement systems utilizing the propagation of acoustic energy through the fluid have demonstrated that volumetric flow, even with badly distorted velocity distributions can be measured to a high degree of accuracy. One such system which is described in U.S. Pat. No. 3,564,912 is based on time measurements of acoustic pulses propagated in opposite directions across the fluid medium. Measurements taken in several acoustic paths are combined according to a numerical integration technique to compute volumetric flow rate.

The acoustic transducers for such multi-path systems are generally enclosed in a housing and acoustic propagation takes place through an acoustic window of the housing. In some situations, such as computing volumetric flow rates of high temperature liquids the acoustic window is relatively thick thus causing a reverberation problem. Reverberation is the ringing which the transducer detects as a result of its own excitation. This reverberation can distort the received signal from the opposed transducer along the acoustic path so that its time of arrival, needed to compute volumetric flow rate, is inaccurately detected. If the magnitude of the reverberation is large enough, the receiver apparatus can even mistake it for a received signal, which results in erroneous time data measurements.

SUMMARY OF THE INVENTION

Instead of simultaneously transmitting acoustic pulses in opposite directions along a single acoustic path, as is done in prior art systems, the present invention provides a system which transmits an acoustic pulse in one direction along one path and in an opposite direction in a second similar but separate acoustic path. After reverberation levels have died away the process is reversed so that the travel times and difference in travel times of acoustic pulses may be obtained. This procedure can be carried out with other acoustic paths and the measurements obtained are processed to provide fluid flow data.

By a second low reverberation arrangement of transducer interconnection, acoustic pulses are simultaneously propagated in the same direction along the two paths and thereafter acoustic pulses are propagated in the reverse direction along those same two paths. By this method additional data can be obtained which allows the calculation of flow along the individual acoustic paths.

DESCRIPTION OF THE PREFERRED EMBODIMENT

Figure 1:
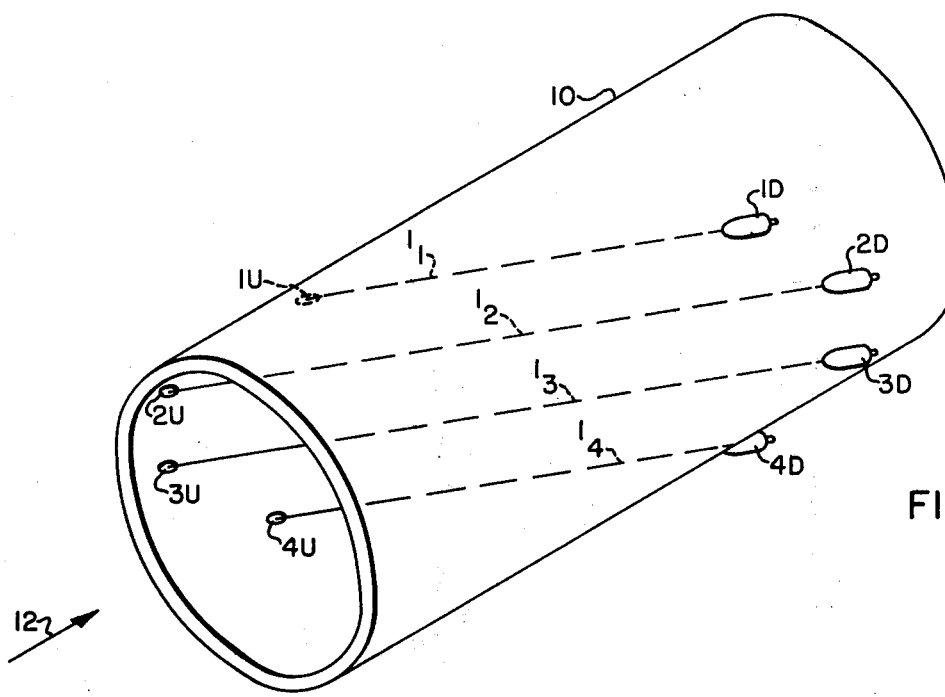
FIG. 1 illustrates a portion of a fluid conveying conduit with a multi-path acoustic transducer placement.

Referring to FIG. 1, there is illustrated a section of conduit, 10 for conveying fluid in an upstream to a downstream direction as indicated by arrow 12. In a multi-path system, a plurality of pairs of transducers are provided with one transducer of each pair constituting an upstream transducer and the other a downstream transducer both in acoustic communication with the fluid in the conduit with the two defining an acoustic path between them.

For example, upstream transducer 1U in conjunction with its opposed downstream transducer 1D define an acoustic path between them of length $l_1$. The second pair of transducers 2U and 2D define a second path of length $l_2$. Opposed transducers 3U and 3D define another acoustic path of length $l_3$ and transducers 4U and 4D define an acoustic path of length $l_4$. In accordance with one system of numerical integration, the transducers are accurately positioned at predetermined locations so that the acoustic paths are at respective predetermined distances from a reference. For a 4-path system and for a circular conduit, the transducers are generally positioned such that $l_1$ is equal to $l_4$ and $l_2$ is equal to $l_3$.

Figure 1A:
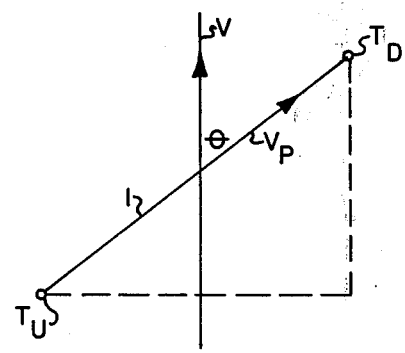
FIG. 1A illustrates the orientation of a typical acoustic path with respect to fluid flow for the conduit of FIG. 1.

FIG. 1A illustrates the general case of acoustic transmission between transducers and the relation of the acoustic path to the direction of fluid flow. The upstream transducer is designated $T_U$ and the downstream transducer is designated $T_D$ with the acoustic path between them being of length 1. The resultant fluid velocity is indicated by the arrow V at an angle $\theta$ with respect to the acoustic path such that the component of fluid velocity $V_P$ along the acoustic path is equal to $V\cos\theta$.

Figure 2:
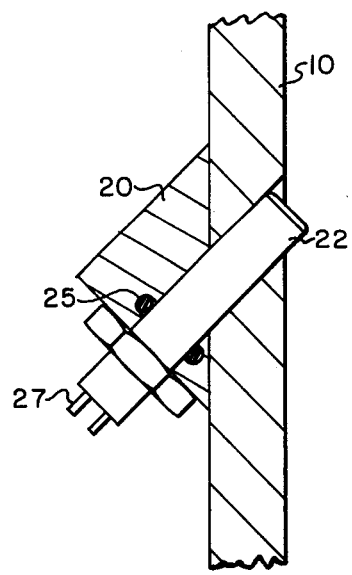
FIG. 2 illustrates a section of the conduit with the acoustic transducer apparatus in position.

FIG. 2 illustrates the mounting of the transducer with respect to the conduit wall. An extension, or boss 20 having a central aperture is secured to the conduit wall 10 which has an accurately aligned aperture provided, for example, by drilling at the precise predetermined transducer location. The transducer itself is contained within a transducer holder 22 which is fitted through the aperture in the extension 20 and the conduit wall 10 and thereafter secured in place. A fluid seal is generally provided such as by O-ring 25 and electrical connections are made by means of electrical coupling 27.

Figure 3:
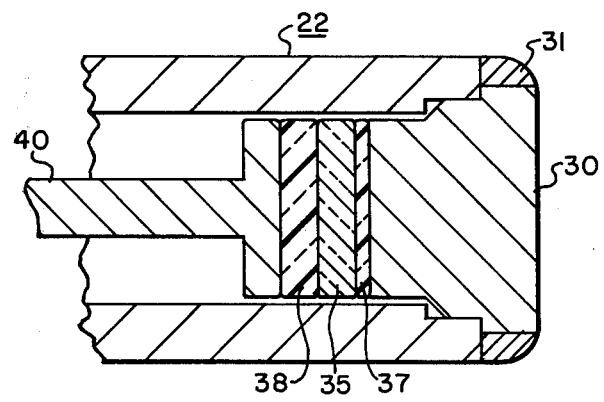
FIG. 3 illustrates a portion of the transducer holder of FIG. 2.

For some applications, such as flow measurements of extremely high temperature fluids, the holder 22 may be welded in position to the extension 20 and is of a construction to withstand the high pressures and temperatures encountered. The acoustic window for such holder is generally fabricated of a metal such as stainless steel, one example being illustrated in FIG. 3. The body of the holder 22 has an acoustic window 30 secured thereto such as by a weld 31. The transducer active element 35 is sandwiched between ceramic insulators 37 and 38 with the components being held in position by means of a center guide unit 40 under compression. For clarity, transducer electrodes and electrical connections are not illustrated. For such construction, as well as for other constructions there may be a tendency for acoustic energy propagated by the active element to reverberate within the acoustic window bouncing off the front and rear surfaces thereof. The effect of this may be illustrated with respect tp FIGS. 4A and 4B.

Figures 4A, 4B:
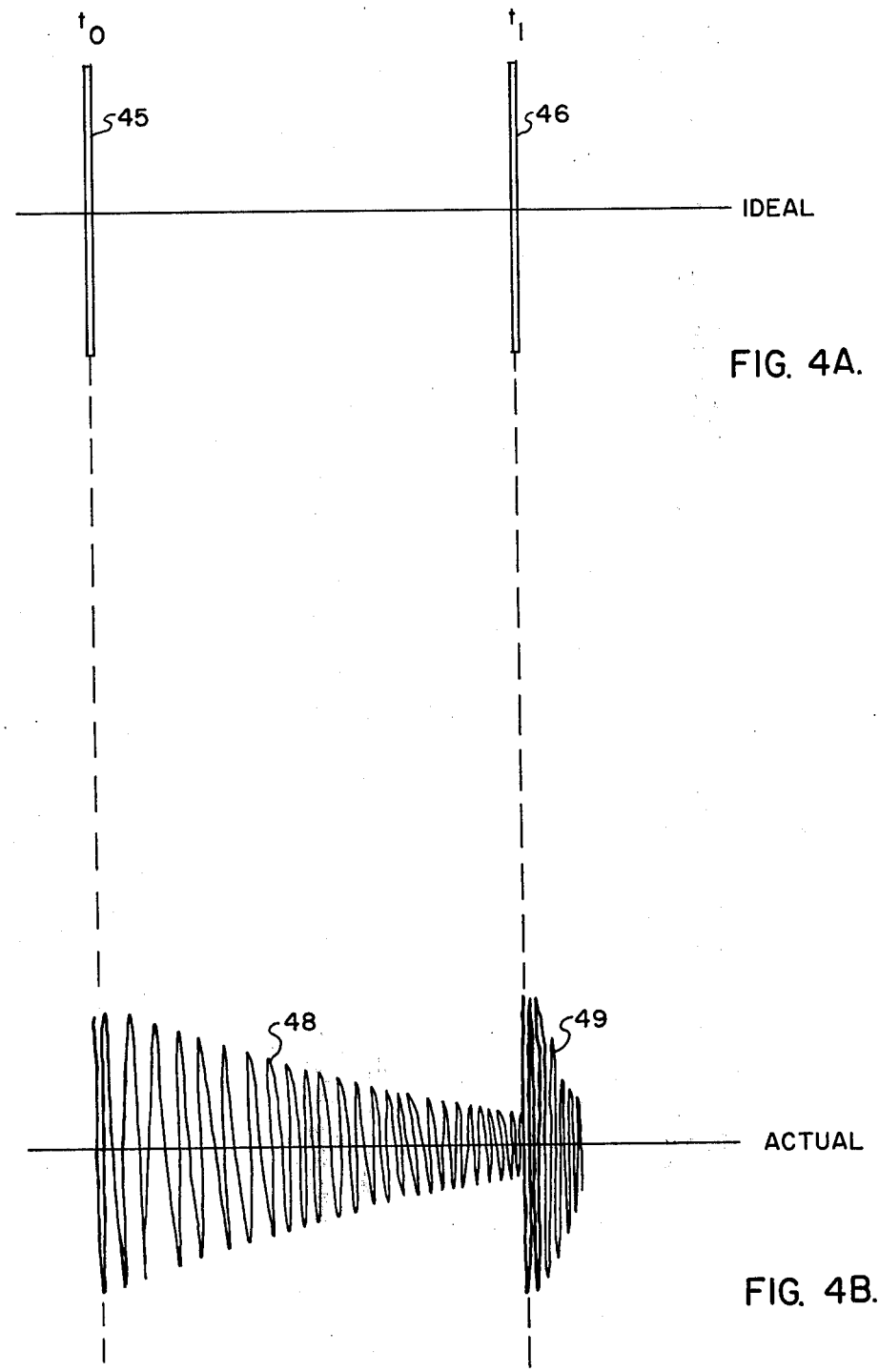
FIG. 4A represents an idealized waveform for transmission and reception of an acoustic pulse propagated along the acoustic path by a transducer and FIG. 4B represents the actual waveform encountered.

In FIG. 4A the waveform 45 represents a pulse ideally transmitted by the transducer at time $t_0$. At time $t_0$ a similar pulse is propagated to the transducer from its opposed transducer along the acoustic path and is received at time $t_1$. The waveform 46 represents the output of the transducer in response to the receipt of such acoustic pulse. Since velocity determinations are made based on the travel time of oppositely directed acoustic pulses, the accurate measurement of these times is of prime importance.

In actuality however and as is illustrated in FIG. 4B, the initial pulse transmitted at time $t_0$ causes reverberation, as illustrated by waveform 48 which slowly decays with time but which may still be present at time $t_1$ when the oppositely directed acoustic pulse if received. Waveform 49 represents this received pulse. In computing travel times of acoustic pulses the leading edge or first half cycle of the received pulse is generally utilized in such determination. If the reverberation 48 has not died away by the time $t_1$, then accurate detection of the received pulse may be impaired.

Figure 5:
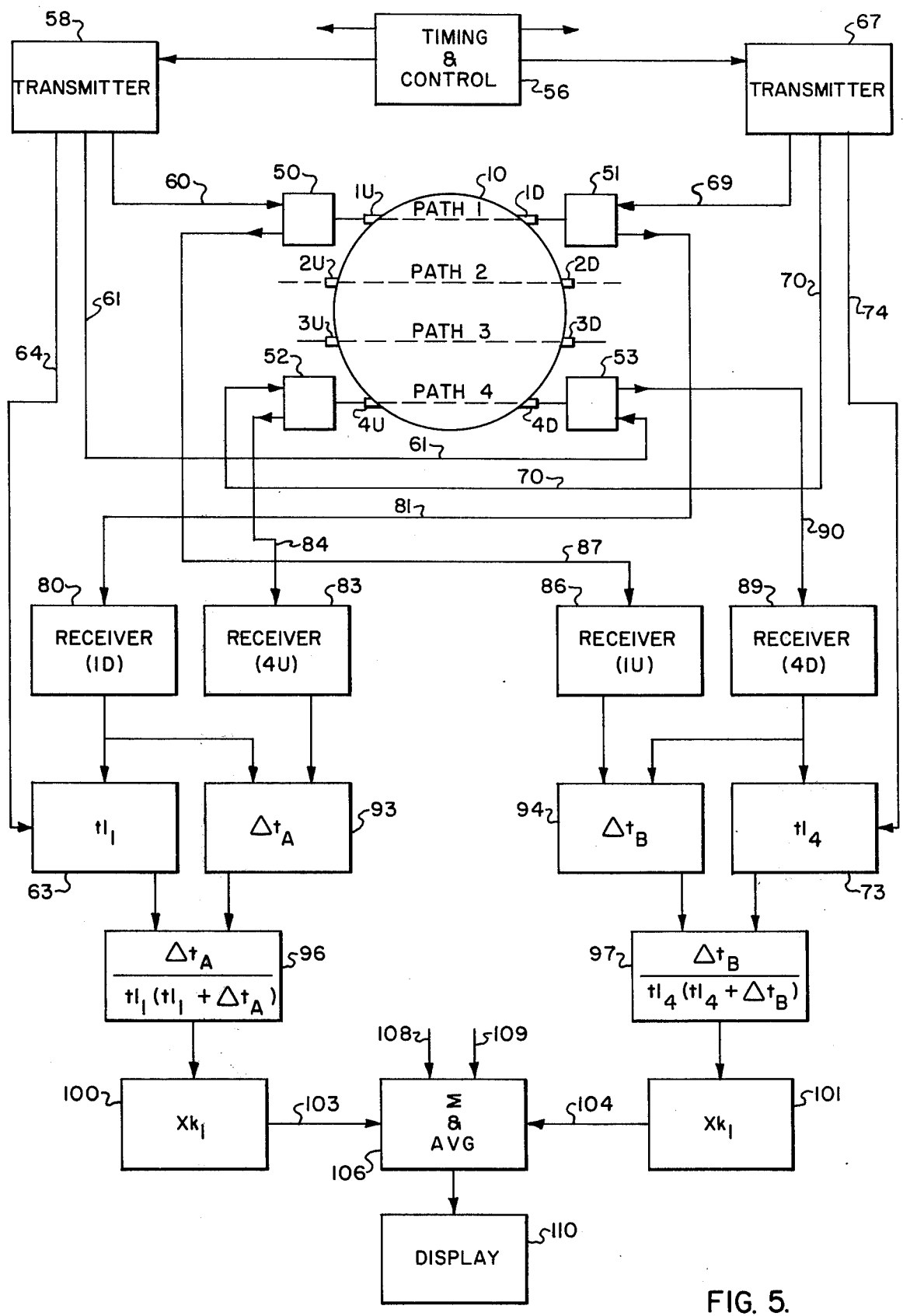
FIG. 5 is a block diagram of an embodiment of the present invention and FIGS. 5A–5F illustrate a typical operation thereof.

With the present invention highly accurate fluid flow measurements are accomplished even if the problem of reverberation is present. However before proceeding with a detailed description of the invention such as illustrated in FIG. 5 it would be beneficial to have an understanding of fluid flow measurements utilizing acoustic pulse travel times.

In general for a single path system such as illustrated for example in FIG. 1A, velocity and volumetric flow rate may be determined by simultaneously energizing transducers $T_U$ and $T_D$ and measuring the acoustic pulse downstream travel time (from $T_U$ to $T_D$) and the acoustic pulse upstream travel time (from $T_D$ to $T_U$). If t1 is the downstream travel time and t2 the upstream travel time then the volumetric flow rate Q may be determined by the relationship:

$$Q = K \frac{t2 - t1}{t1\,t2} \quad (1)$$

where K is a constant dependent upon such factors as 1, $\theta$, and conversion units. The difference in travel times of the oppositely directed acoustic pulses along the path is $\Delta t$ and $$\Delta t_i = t2 - t1 \quad (2)$$

Since $t2 = t1 + \Delta t$ $$Q = K \frac{\Delta t}{t1(t1 + \Delta t)} \quad (3)$$

Equation 3 may be implemented with the provision of two counters, one a t1 counter which is turned on at the time of the acoustic transmission and which is turned off when the downstream transducer receives the acoustic pulse. A second counter, a $\Delta t$ counter is turned on when the downstream pulse is received and is turned off when the upstream pulse is received with the resulting count being indicative of the difference in travel times.

A more accurate determination of volumetric flow rates in a conduit may be obtained with a multi-path system utilizing numerical integration techniques such as the Gaussian technique where:

$$Q = \frac{D}{2} \sum_{i=1}^{n} q_i \quad (4)$$

The following definitions are used:
Q is the volumetric flow rate;
D is the diameter of the conduit;
n is the number of paths;
i is a particular path number;

$$q_i = W_i l_i^2 \tan\theta_i \frac{\Delta t_i}{t1_i(t1_i + \Delta t_i)}$$

$W_1$ is the Gaussian weighting factor for the $i^{th}$ path. Thus for a four path system such as illustrated in FIG. 1:

$$Q = \frac{D}{2} \left[ q_1 + q_2 + q_3 + q_4 \right] \quad (5)$$

Examining just the short paths 1 and 4:

$$Q = \left\{ \frac{D}{2} \left[ W_1 l_1^2 \tan\theta_1 \left( \frac{\Delta t_1}{t1_1(t1_1 + \Delta t_1)} \right) \right. \right.$$

$$\left. \left. + W_4 l_4^2 \tan\theta_4 \left( \frac{\Delta t_4}{t1_4(t1_4 + \Delta t_4)} \right) + q_2 + q_3 \right] \right\} \quad (6)$$

In Equation 6, $\Delta t_1$ is the difference in travel time of oppositely projected acoustic pulses in path 1 and $\Delta t_4$ is the difference in travel time of oppositely projected acoustic pulses in path 4. In the present arrangement time measurements from one path are combined with time measurements from another path. More specifically the difference in travel time is obtained from acoustic pulses traveling in opposite directions n two different paths as opposed to a single path. By way of example, with a Gaussian integration arrangement as previously described, a $q_1'$ and a $q_4'$ are derived where:

$$q_1' + q_4' = W_a l_a^2 \tan\theta_a \left( \frac{\Delta t_A}{t1_1(t1_1 + \Delta t_A)} + \frac{\Delta t_B}{t1_4(t1_4 + \Delta t_B)} \right) \quad (7)$$

Where $$W_a l_a^2 \tan\theta_a = \frac{W_1 l_1^2 \tan\theta_1 + W_4 l_4^2 \tan\theta_4}{2} \quad (8)$$

Although the same treatment may be accorded the long paths, paths 2 and 3, only the short paths, paths 1 and 4 will be discussed in detail. In Equation 7, $\Delta t_A$ is the difference in time travel between an acoustic pulse projected upstream in path 4 and downstream in path 1 while $\Delta t_B$ is the difference in travel time between an acoustic pulse projected upstream in path 1 and downstream in path 4, that is:

$$\Delta t_A \equiv t2_4 - t1_1 \quad (9)$$

$$\Delta t_B \equiv t2_1 - t1_4 \quad (10)$$

since $$t2_4 = t1_4 + \Delta t_4 \text{ and} \tag{11}$$

$$t2_1 = t1_1 + \Delta t_1 \tag{12}$$

it may be shown that $$\Delta t_A + \Delta t_B = \Delta t_1 + \Delta t_4 \tag{13}$$

An implementation of this concept is illustrated in FIG. 5 to which reference is now made. Opposed transducer pairs 1U and 1D and 4U and 4D are in signal communication with the remainder of the circuitry through respective TR/ATR (transmit/anti-transmit) switch networks 50 to 53 as is well known to those skilled in the art.

Transmitter means under control of a central timing and control circuit 56 is operable to selectively energize predetermined transducers. The transmitter means may include a first transmitter 58 for simultaneously energizing transducer 1U via lead 60, transducer 4D via lead 61 and is also operable to initiate the counting process in a $t1_1$ counter 63, via lead 64.

In a similar manner and at a later point in time transmitter 67 is operable to simultaneously energize transducer 1D via lead 69, and transducer 4U via lead 70. $t1_4$ counter 73 also receives a signal from transmitter 67 via lead 74 to initiate its counting function.

In order to provide indications of receipt of acoustic pulses transmitted through the water medium, there is provided a plurality of receivers operably connected to the various transducers. Receiver 80 is connected to receive the output signal from transducer 1D via lead 81; receiver 83 is connected to receive the output signal from transducer 4U via lead 84; receiver 86 is connected to receive the output signal from transducer 1U via lead 87 and receiver 89 is connected to receive the output signal from transducer 4D via lead 90.

For purposes of discussion and ease of explanation, various time delays associated with such circuitry have been neglected so that the output signals provided by the receivers are indicative of acoustic pulses arriving at the receiving transducers. The implementation of Equation 7 involves the determination of not only $t1_1$ and $t1_4$ but of $\Delta t_A$ and $\Delta t_B$, and accordingly there is provided circuit means in the form of $\Delta t$ counters, $\Delta t_A$ counter 93 and $\Delta t_B$ counter 94 for this purpose.

The set of signals related to the travel times of the acoustic pulses provided by the various counters 63, 93, 73 and 94 are provided to computing circuits 96 and 97 where the indicated mathematical process is performed. The result of the mathematical process is modified by respective constants $k$ in circuits 100 and 101 and where $k$ would include not only proper scaling factors for the units to be displayed but would include the averaged Gaussian weighting factor and other terms of Equation 8. The results of the multiplication are provided on respective leads 103 and 104 to a summation and averaging circuit 106 where, for example, the summation of Equation 7 may be implemented and which additionally receives comparable signals from the other paths (from circuitry not shown) on leads 108 and 109. The process may be repeated a number of times so that an average reading may be obtained and provided to a utilization means such as a display 110.

Figure 5A:
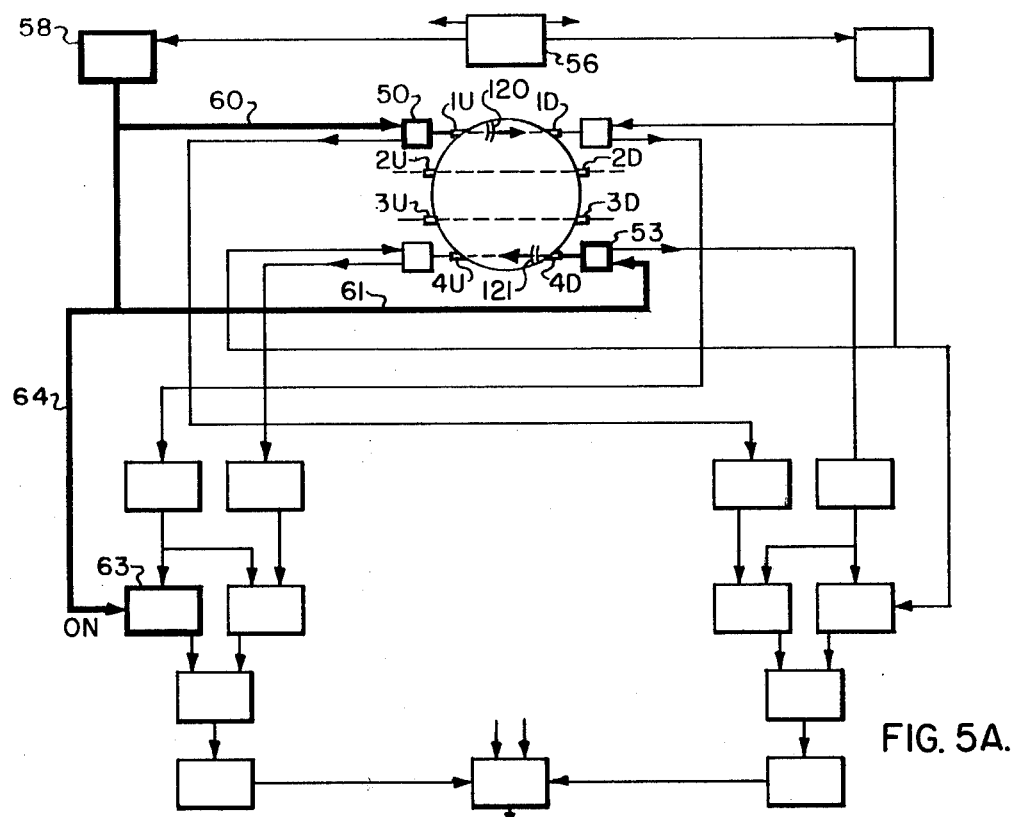

A typical operation is described with respect to FIGS. 5A–5F wherein the active components are illustrated with heavy lines. In FIG. 5A, as a result of energization by transmitter 58, an acoustic pulse 120 is sent downstream along path 1 and an acoustic pulse 121 is sent upstream along path 4. Commensurate with the initiation of these pulses, the $t1_1$ counter 63 is turned on.

Figure 5B:
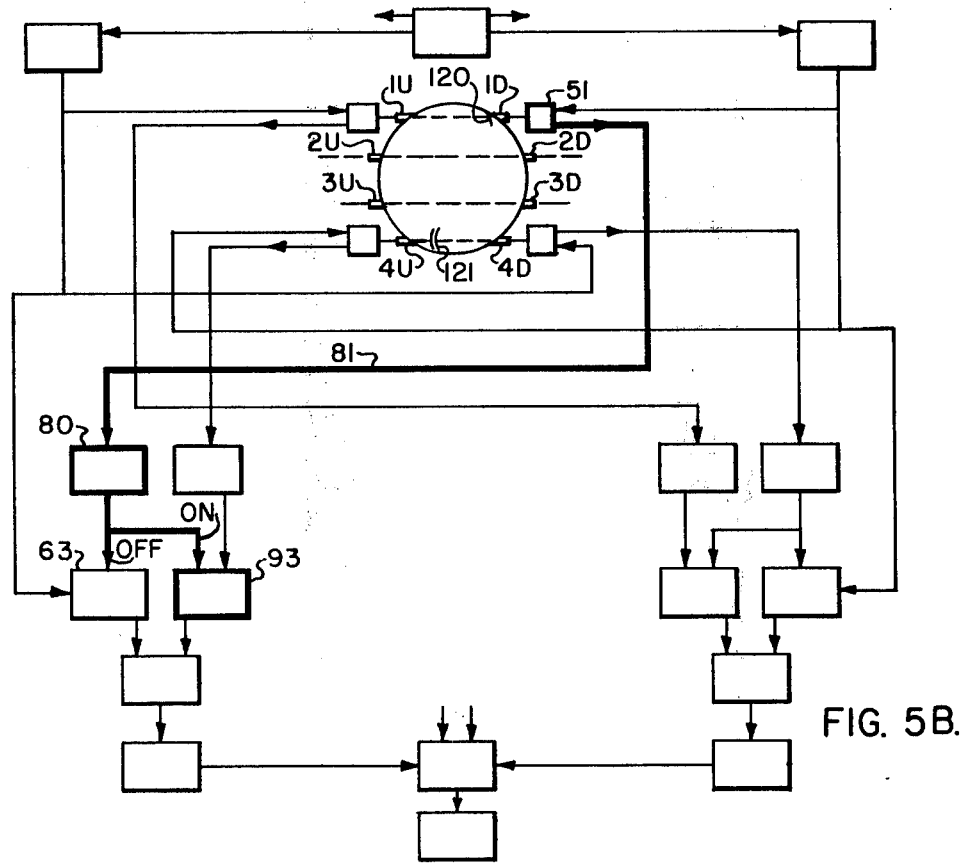

The downstream projected pulse arrives at its opposed transducer first, as illustrated in FIG. 5B, thus causing receiver 80 to provide an output signal which turns off the $t1_1$ counter 63 and turns on the $\Delta t_A$ counter 93.

Figure 5C:
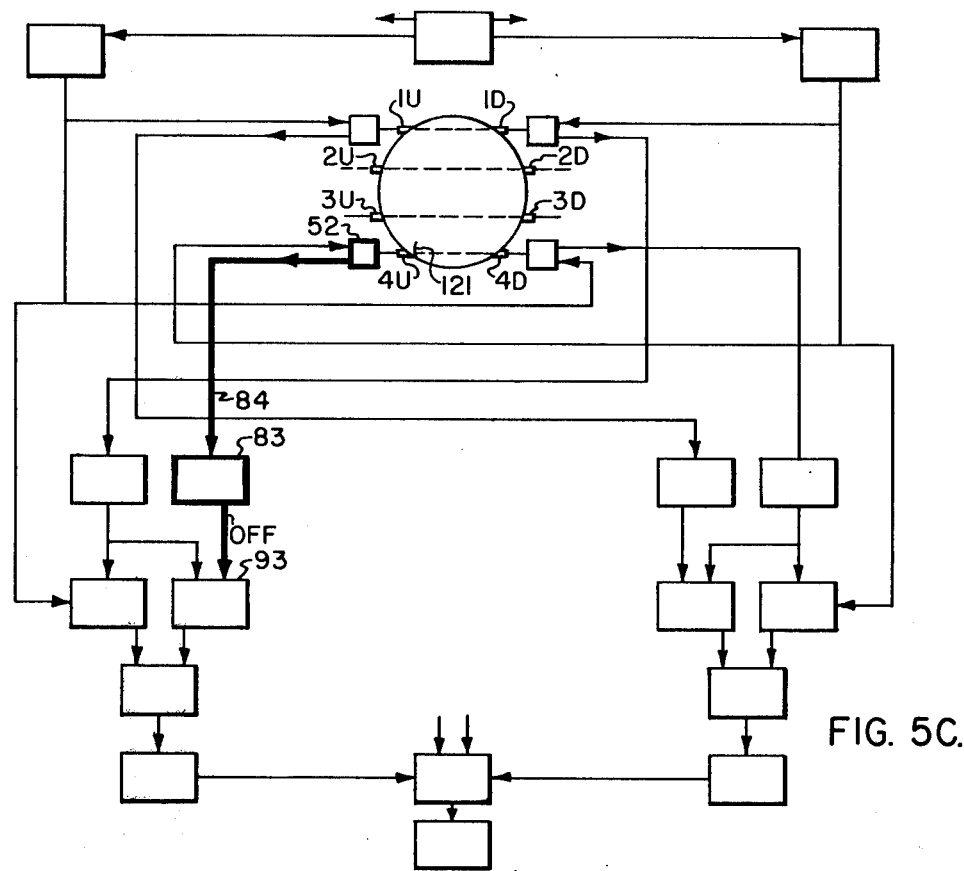

After pulse 121 is received by transducer 4U, as illustrated in FIG. 5C, receiver 83 will provide an output signal to turn off the $\Delta t_A$ counter 93. The count in the $t1_1$ counter therefore is indicative of downstream travel time while the count in the $\Delta t_A$ counter 93 is indicative of the difference in travel times of oppositely projected acoustic pulses, not in the same path as in prior art systems but in two separate but similar paths.

Figure 5D:
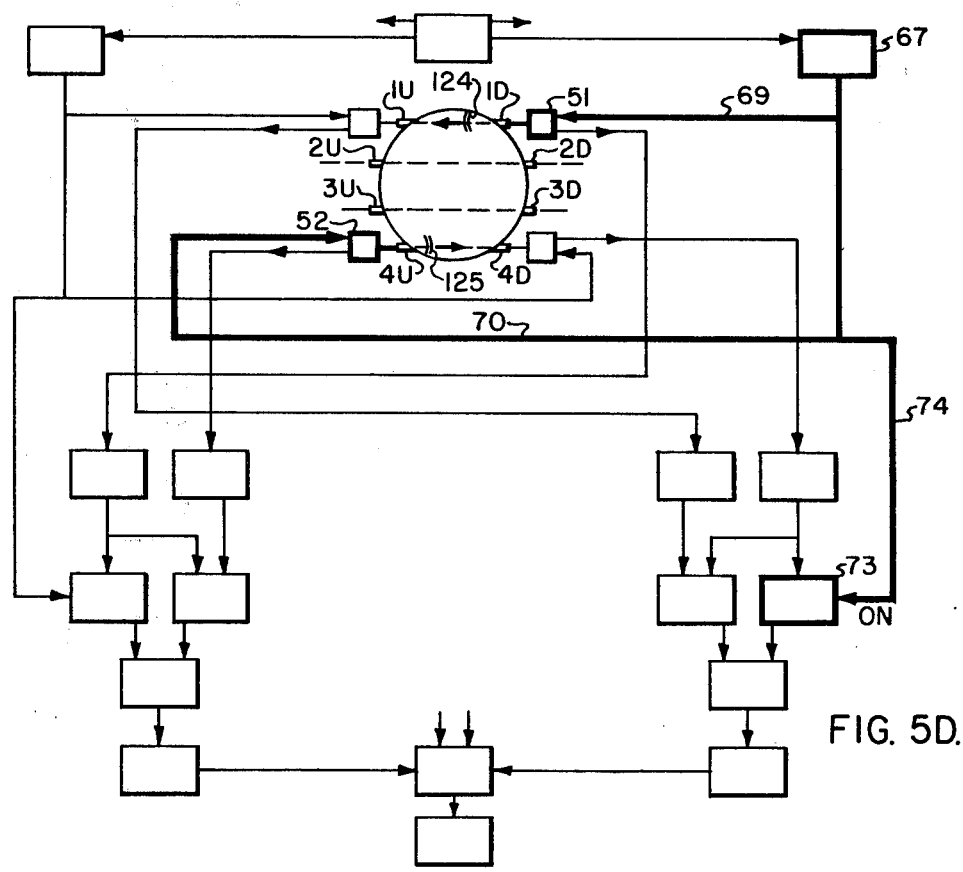

FIG. 5D illustrates a transmission at a subsequent point in time by transmitter 67 which causes an acoustic pulse 124 to be transmitted upstream along path 1 and acoustic pulse 125 to be transmitted downstream along path 4. The $t1_4$ counter 73 at this point commences its counting function.

Figure 5E:
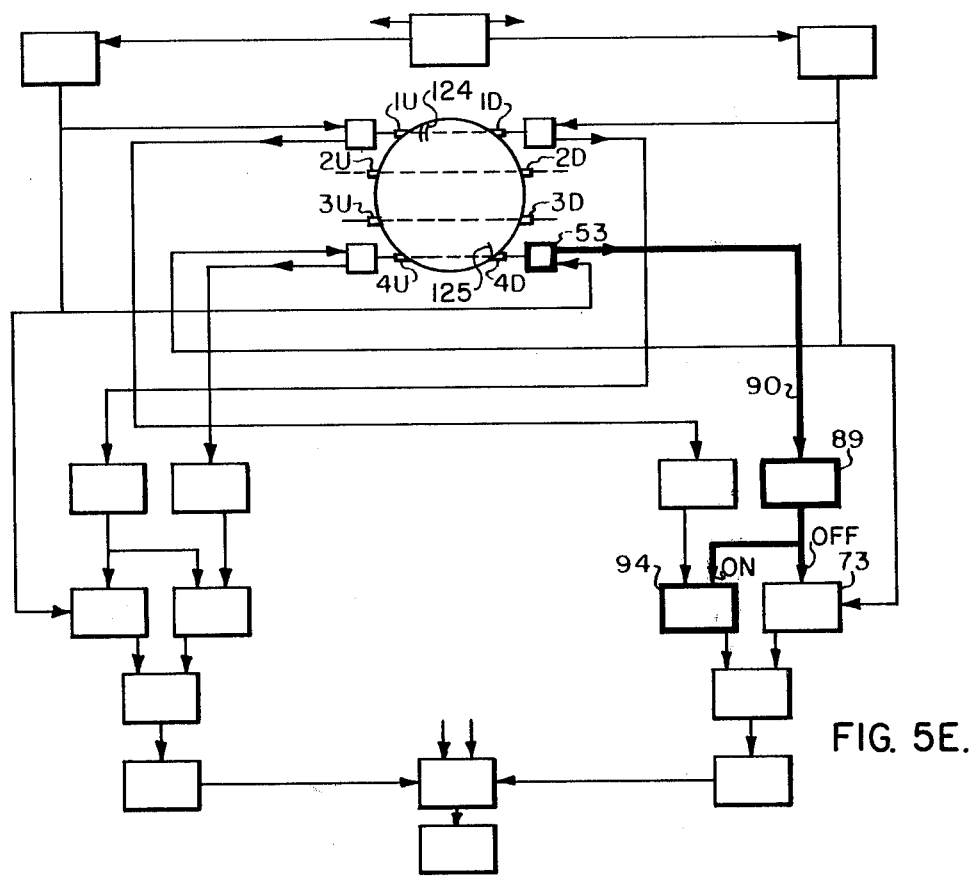

As illustrated in FIG. 5E, the acoustic pulse 125 traveling downstream arrives at transducer 4D and causes receiver 89 to turn off the $t1_4$ counter 73 and to turn on the $\Delta t_B$ counter 94.

Figure 5F:
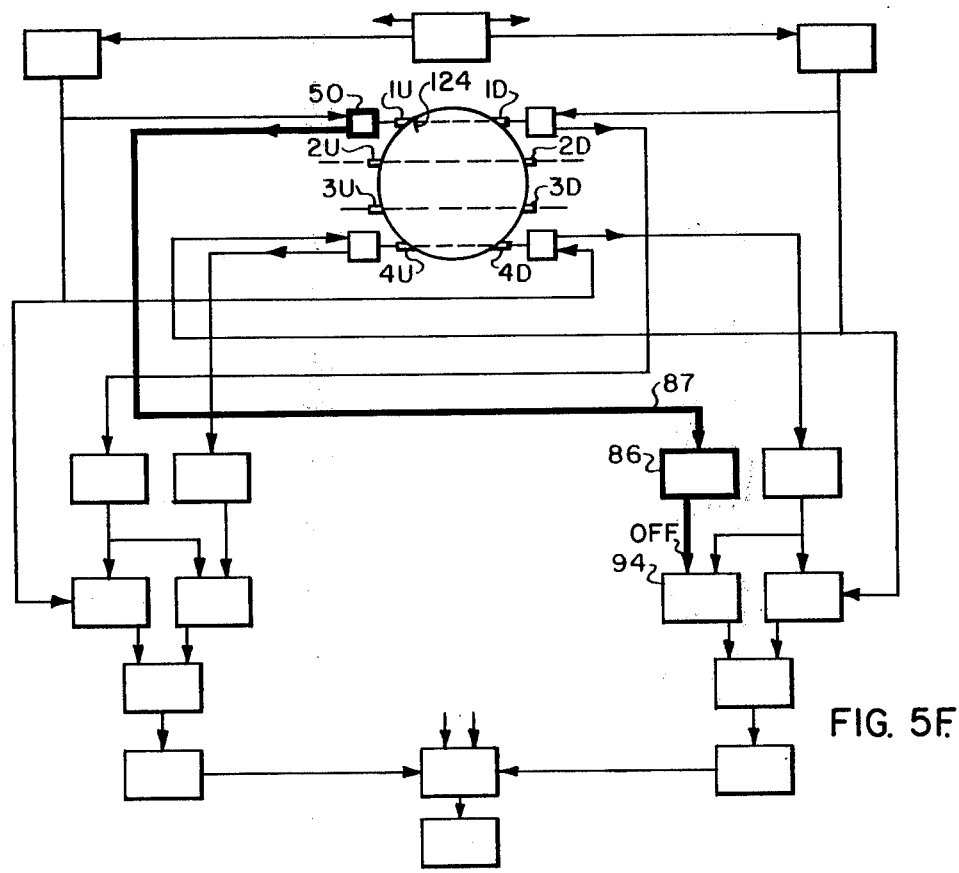

When acoustic pulse 124 traveling upstream arrives at transducer 1U, as illustrated in FIG. 5F, receiver 86 will shut the $\Delta t_B$ counter 94 off.

Thus with the described arrangement, individual transducers will project an acoustic pulse along a particular path and will receive an acoustic pulse along that path at a point in time after reverberation has died away so that the accurate detection of the signal may take place.

A similar arrangement could be provided for both paths 2 and 3 or if the geometry is such that the path lengths are long enough for reverberation to die away by a time a pulse is to be received, a conventional arrangement could be used.

It will be apparent to those skilled in the art that once having the related time signals the required mathematical manipulation may be carried out in a variety of ways. Further, although separate transmitters and separate signal processing channels have been illustrated, the calculation may be implemented with a single transmitter, a single $t1$ counter, a single $\Delta t$ counter and a central arithmetic section, together with appropriate switching and gating circuitry. One such arrangement for this implementation is described in U.S. Pat. No. 3,918,304, assigned to the assignee of the present invention and hereby incorporated by reference.

In the present described arrangement, the combined measurements $q_1'$ and $q_4'$ are directly related to the sum of the short path flows $q_1$ and $q_4$; that is:

$$q_1' + q_4' = q_1 + q_4 \tag{14}$$

Thus there is available in the summation and averaging circuit 106 for example a quantity indicative of the sum of the individual flow rates in paths 1 and 4 as opposed to the individual flow rate in path 1 itself and the individual flow rate in path 4 itself. If this latter information is desired then by a revised arrangement a determination of the difference in path flows may be obtained and having the sum and difference quantities a determination of individual path parameters may be obtained. This may be demonstrated as follows. The sum of the individual flows in paths 1 and 4 is given in Equation 14 and the difference will be shown to be that relationship in the following Equation 15:

$$q_1'' + q_4'' = q_1 - q_4 \quad (15)$$

By combining the prime and double primed quantities, individual flow rates may be obtained as follows:

$$q_1 = \frac{(q_1' + q_4') + (q_1'' + q_4'')}{2} \quad (16)$$

$$q_4 = \frac{(q_1' + q_4') - (q_1'' + q_4'')}{2} \quad (17)$$

With this arrangement the following measurements are made:

$$q_1'' = k \frac{t2_1 - t2_4}{t2_1 t2_4} \quad (18)$$

$$q_4'' = k \frac{t1_4 - t1_1}{t1_1 t1_4} \quad (19)$$

Combining 18 and 19:

$$q_1'' + q_4'' = k \left( \frac{t2_1 - t2_4}{t2_1 t2_4} + \frac{t1_4 - t1_1}{t1_4 t1_1} \right) \quad (20)$$

Placing the term in brackets over a common denominator and thereafter manipulating and rearranging it can be shown that:

$$q_1'' + q_4'' = k \left( \frac{t2_1 - t1_1}{t1_1 t2_1} - \frac{t2_4 - t1_4}{t1_4 t2_4} \right) \quad (21)$$

Which expression reduces to:

$$q_1'' + q_4'' = q_1 - q_4 \quad (22)$$

Figure 6:
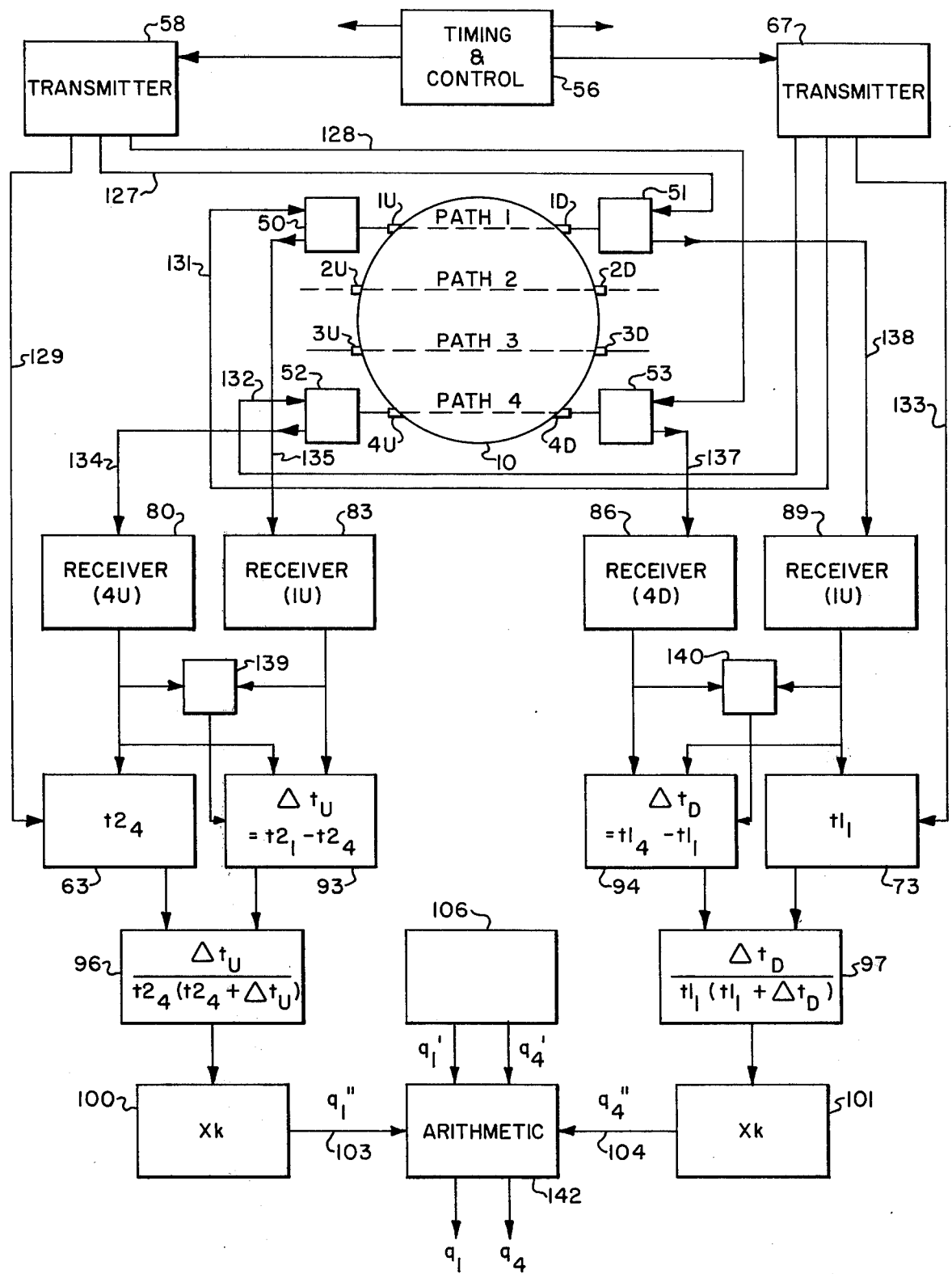
FIG. 6 is a block diagram illustrating an alternate arrangement for a second mode of operation and FIGS. 6A–6F illustrate the operation thereof.

The arrangement for obtaining the quantities $q_1''$ and $q_4''$ is illustrated in FIG. 6 wherein the individual circuit components may be the same as those described with respect to FIG. 5, and accordingly have been given the same reference numerals. The differences lie in the interconnections resulting in a different mode of operation. Instead of transmitting in opposite directions on two different paths, acoustic pulses are transmitted in the same direction on two different paths and at a later point in time in the opposite direction. Accordingly, transmitter 58 is connected to simultaneously energize the downstream transmitters 1D and 4D by way of leads 127 and 128 respectively and is operable to start counter 63 via lead 129.

In order to simultaneously project acoustic pulses from the upstream transducers to the downstream transducers, transmitter 67 is connected to transducers 1U and 4U via respective leads 131 and 132 and is also operable to initiate counter 73 via lead 133.

Receivers 80 and 83 now respectively function to receive the acoustic pulses from transducers 4U and 1U via leads 134 and 135 while receivers 86 and 89 are respectively connected to receive outputs from transducers 4D and 1D via leads 137 and 138.

Although the counters have been given the same reference numerals as those in FIG. 5, they basically receive different input signals for generation of quantities to implement equations 18 and 19. Accordingly counter 63 is operable to provide an indication of $t2_4$, the upstream travel time of an acoustic pulse along path 4, while counter 93 is operable to provide an indication of a time difference, the difference in arrival time of the acoustic pulse in path 1 as compared with the arrival time of the acoustic pulse in path 4 and this quantity has been designated $\Delta t_U$.

The assumption is made that the path 4 acoustic pulse is received first, however in actuality it may be the latter received pulse. The ambiguity can be resolved however with the provision of a circuit 139 which is responsive to the output signals provided by receivers 80 and 83 to change the sign of the quantity in the $\Delta t_U$ counter 93 if the pulses are received in reverse order.

As a result of the downstream transmission of acoustic pulses along paths 1 and 4, path 1 transducer 1D is assumed to receive the pulse first so that receiver 89 will turn off the counter 73 which provides an indication of the downstream travel time on path 1, $t1_1$. The difference in transit time between the two downstream projected acoustic pulses is obtained by a counter 94 which is designated as a $\Delta t_D$ counter. Circuit 140 is provided to change the sign of the count in the counter 94 should the pulses arrive in reverse order. Although not previously illustrated, the circuits 139 and 140 may also be provided in the arrangement of FIG. 5 to accommodate for bi-directional flow.

Circuits 96 and 97 perform the indicated arithmetic operation the results of which are multiplied by the predetermined constants of circuits 100 and 101 to yield the quantities $q_1''$ on lead 103 and $q_4''$ on lead 104. With these quantities calculation of the individual path flow rates may be performed in accordance with Equations 16 and 17. This calculation may be accomplished by hand computation or, as illustrated in FIG. 6 by an arithmetic section 142. The arithmetic section 142 receives these quantities $q_1''$ and $q_4''$ as well as the quantities $q_1'$ and $q_4'$ from the previous operation described with respect to FIG. 5 to perform the arithmetic manipulation described in Equations 16 and 17 thereby yielding outputs $q_1$ and $q_4$ indicative of individual flows along paths 1 and 4.

Figure 6A:
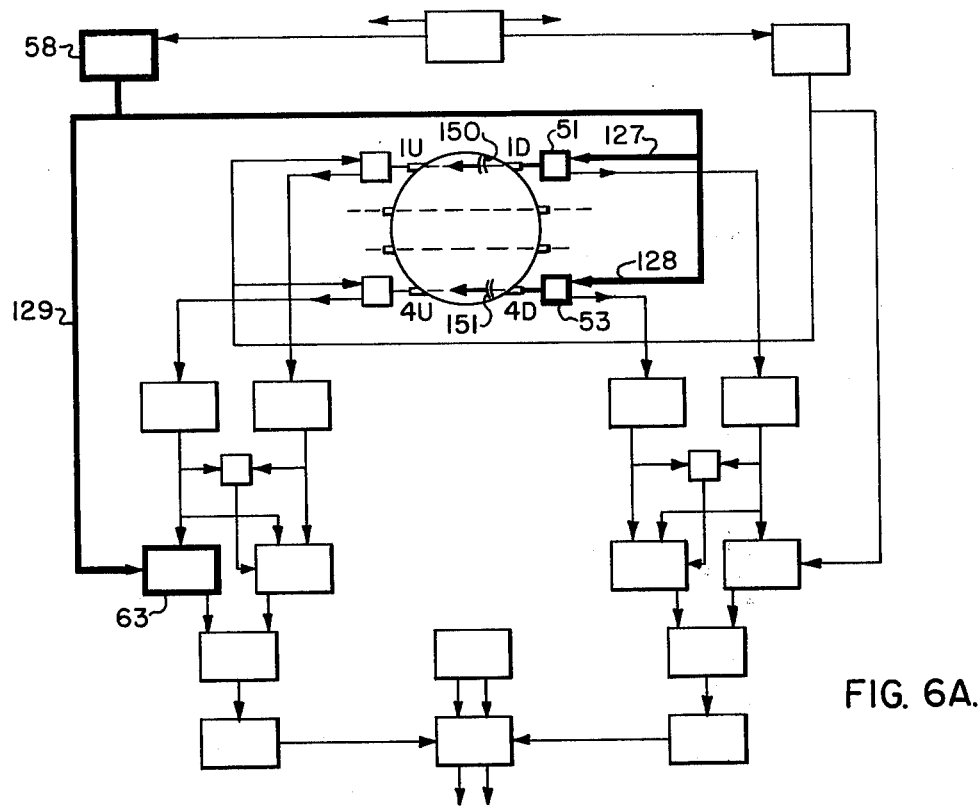
Figure 6B:
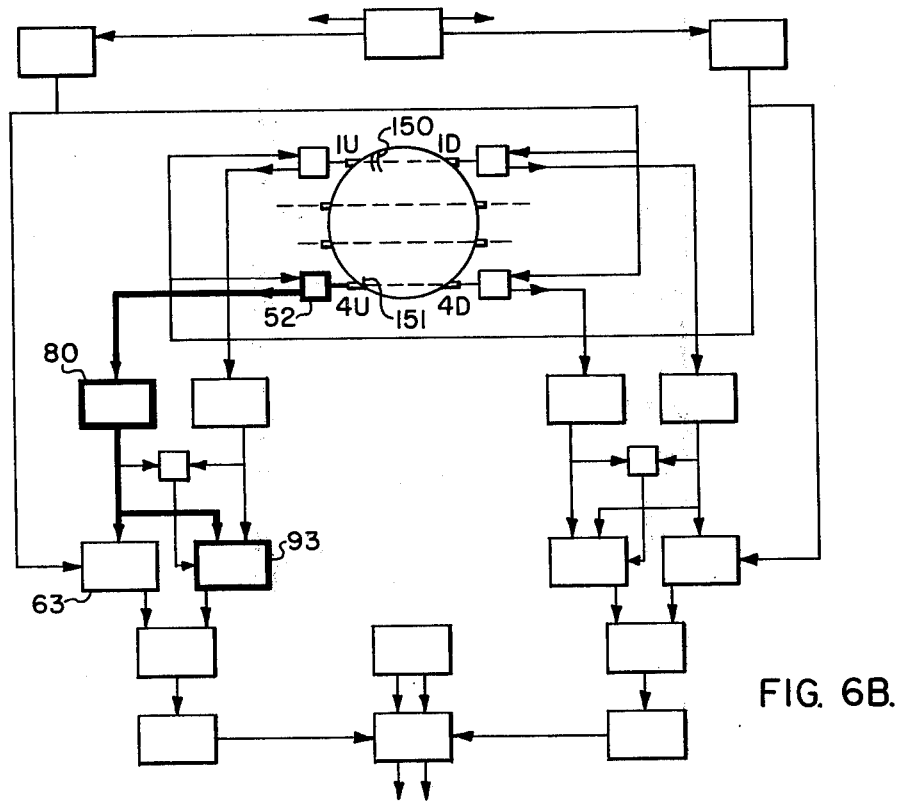

This latter mode of operation is further demonstrated in FIGS. 6A–6F wherein active components have been highlighted with bold lines. In FIG. 6A, as a result of energization by transmitter 58 downstream transducers 1D and 4D simultaneously project respective acoustic pulses 150 and 151 along respective paths 1 and 4. Concurrently with the energization, $t2_4$ counter 63 is turned on. Let it be assumed that pulse 151 arrives first such that receiver 80 provides output signal to turn off counter 63 and to turn on $\Delta t_U$ counter 93, as illustrated in FIG. 6B.

Figure 6C:
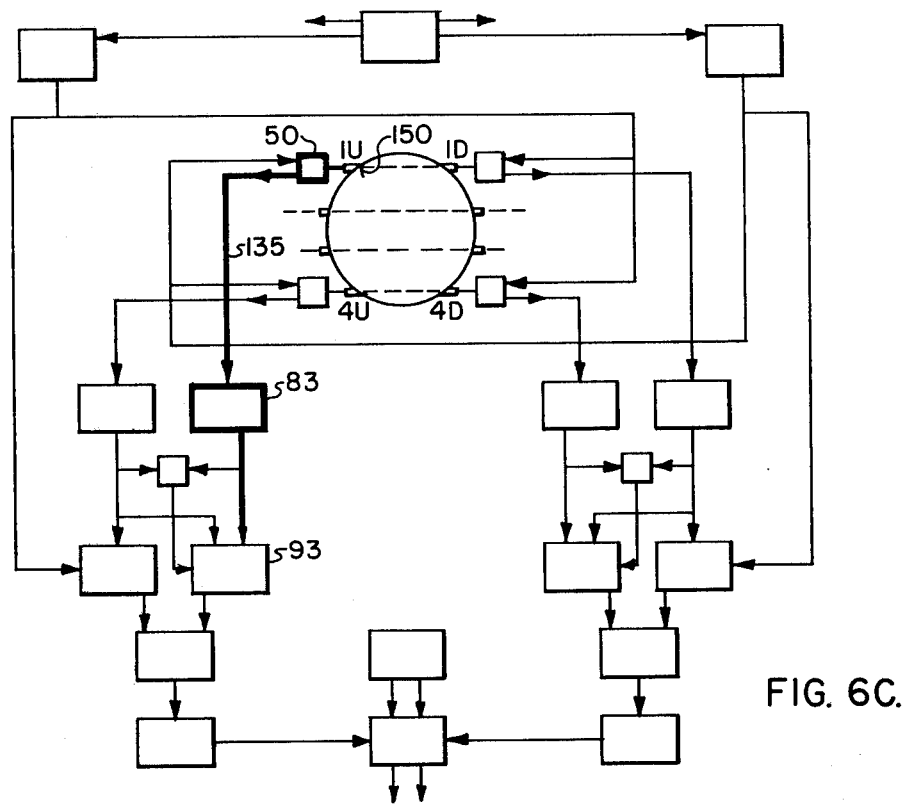

FIG. 6C illustrates the impingement of acoustic pulse 150 causing receiver 83 to provide an output signal to turn off the $\Delta t_U$ counter 93.

Figure 6D:
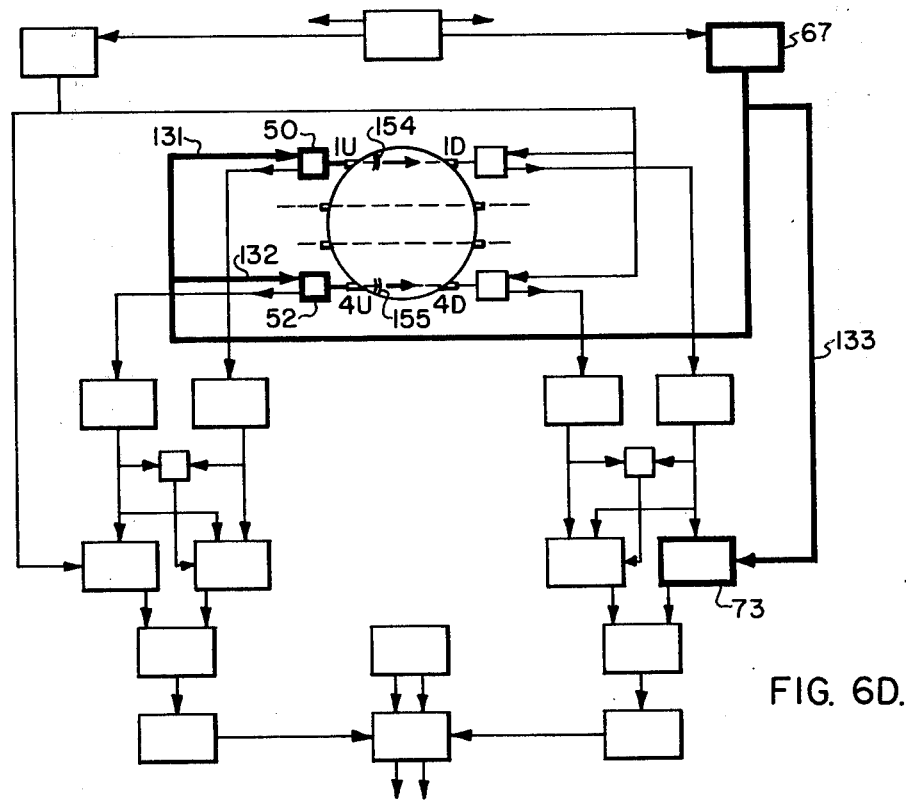

At a later point in time and as illustrated in FIG. 6D, transmitter 67 simultaneously energizes upstream transducers 1U and 4U so as to project acoustic pulses 154 and 155 in the same downstream directions along paths 1 and 4. Concurrent with this energization the $t1_1$ counter 73 is turned on.

Figure 6E:
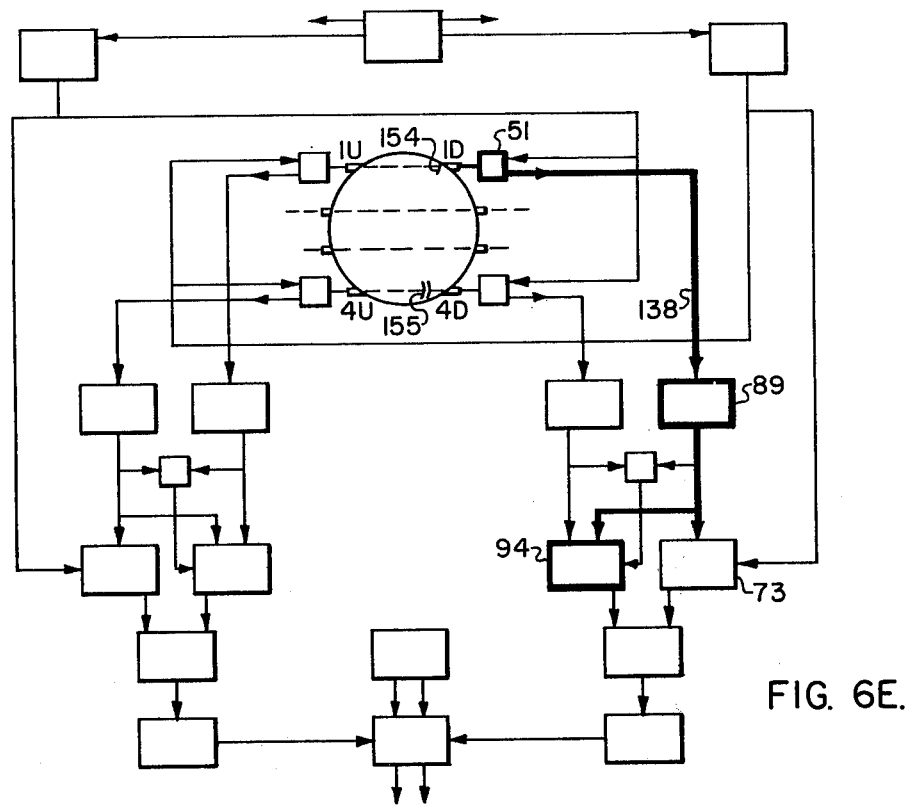

In FIG. 6E acoustic pulse 154 arrives first such that receiver 89 turns off the $t1_1$ counter 73 and turns on the $\Delta t_D$ counter 94.

Figure 6F:
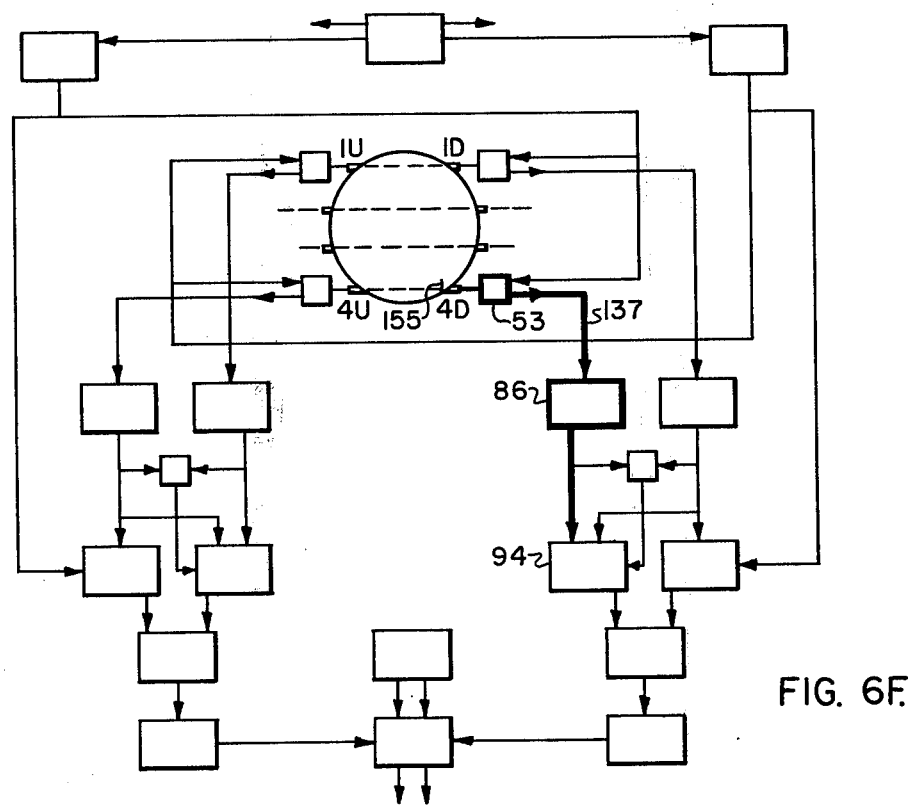

In FIG. 6F the acoustic pulse 155 has arrived at the downstream transducer such that receiver 86 turns off the $\Delta t_D$ counter 94.

This second mode of operation for deriving the quantities $q_1''$ and $q_4''$ is accomplished with the same equipment as the first mode of operation with a different interconnection of components. This interconnection may be made by hand by manipulation of the connecting cables or it may be performed automatically by the provision of appropriate switching networks if so desired.

I claim:

1. Fluid flow measurement apparatus comprising:
   a. a plurality of pairs of opposed upstream and downstream transducers each said pair positioned to transmit and receive acoustic pulses toward and from one another along an acoustic path through said fluid;
   b. means for simultaneously causing said transducers to project first and second acoustic pulses, one in one direction in one of said paths and the other in an opposite direction in another of said paths to derive a first set of signals related to the travel times of said first and second acoustic pulses between said transducers;
   c. said first set of signals including
      i. a signal indicative of the difference in travel times between said first and second pulses, and
      ii. a signal indicative of the downstream travel time of the downstream projected pulse;
   d. said means being subsequently operable to simultaneously cause the transducers receiving said oppositely directed first and second pulses to project third and fourth acoustic pulses to derive a second set of signals related to the travel times of said third and fourth acoustic pulses, between said transducers;
   e. said second set of signals including
      i. a signal indicative of the difference in travel times between said third and fourth pulses, and
      ii. a signal indicative of the downstream travel time of the downstream projected pulse; and
   f. circuit means for computing fluid flow utilizing said first and second set of signals.

2. Fluid flow measurement apparatus comprising:
   a. a plurality of pairs of opposed upstream and downstream transducers each said pair positioned to transmit and receive acoustic pulses toward and from one another along an acoustic path through said fluid;
   b. means for simultaneously causing said transducers to project first and second acoustic pulses, one in one direction in one of said paths and the other in an opposite direction in another of said paths to derive a first set of signals related to the travel times of said first and second acoustic pulses between said transducers;
   c. said means being subsequently operable to simultaneously cause the transducers receiving said oppositely directed first and second pulses to project third and fourth acoustic pulses to derive a second set of signals related to the travel times of said third and fourth acoustic pulses, between said transducers; and
   d. circuit means for computing fluid flow utilizing said first and second set of signals, and including
      i. means for modifying said sets of signals by a constant factor; and
      ii. said constant factor being a function of at least the average of said path lengths squared and the average of the angle of said paths relative to fluid flow direction.

3. Apparatus for obtaining flow measurements of a fluid in a fluid conveying conduit wherein the fluid flows in an upstream to downstream direction, comprising:
   a. a plurality of pairs of transducers, one transducer of each said pair constituting an upstream transducer and the other a downstream transducer, both in acoustic communication with said fluid, with the two defining an acoustic path between them;
   b. transmitter means for selectively energizing said transducers for simultaneously an acoustic pulse from an upstream to an opposed downstream transducer in a first one of said paths and in an opposite direction from a downstream to an opposed upstream transducer in a second similar but separate one of said paths;
   c. means for calculating the difference in travel time to their opposed transducers of said oppositely directed acoustic pulses for obtaining a first difference signal;
   d. said transmitter means being additionally operable after a predetermined time duration to energize said transducers for simultaneously transmitting an acoustic pulse from the downstream to upstream transducer in said first path and in an opposite direction from the upstream to downstream transducer in said second path;
   e. means for calculating, as a result of said additional transmission, the difference in travel times to their opposed transducers, of said pulses to obtain a second difference signal; and
   f. circuit means for computing fluid flow utilizing said first and second difference signals.

4. Apparatus according to claim 3 which includes means for modifying said
   a. first and second set of signals by a factor including $W_s l_s^2 \tan\theta_s$ where
   $l_s^2$ is the average of the first path length squared and the second path length squared,
   $\theta_s$ is the average of the respective first and second path angles relative to fluid flow, and
   $W_s$ is an appropriate Gaussian weighting factor.

5. Apparatus according to claim 3 which includes:
   a. at least four said acoustic paths, defining two outermost paths and a plurality of intermediate paths;
   b. said two outermost paths being nominally equal in length and being the shorter of said paths; and
   c. said two outermost paths constituting said first and second paths.

6. Apparatus according to claim 3 wherein:
   a. said apparatus is additionally operable in a second mode of operation
      i. to simultaneously project acoustic pulses in the same first direction along said first and second paths for deriving a third set of time signals,
      ii. and thereafter to simultaneously project acoustic pulses in a second and opposite direction along said first and second paths for deriving a fourth set of time signals; and
   b. circuit means for calculating individual path flow rates utilizing said first, second, third and fourth sets of signals.

7. Fluid flow measurement apparatus comprising a. a plurality of pairs of opposed upstream and downstream transducers each said pair positioned to transmit and receive acoustic pulses toward and from one another along an acoustic path through said field;

b. means for selectively energizing said transducers to project acoustic pulses through said fluid along predetermined ones of said paths and in predetermined different directions;

c. receiver means for detecting received projected acoustic pulses to provide time signals indicative of various predetermined travel times of acoustic pulses through said fluid;

d. circuit means responsive to said provided time signals to implement the following $$Q = k \left[ \frac{\Delta t_A}{t1_i(t1_i + \Delta t_A)} + \frac{\Delta t_B}{t1_j(t1_j + \Delta t_B)} \right] + B$$

where:

Q is volumetric flow rate;

k is a constant;

$t1_i$ is the transit time of an acoustic pulse from an upstream transducer to a downstream transducer in path i;

$t1_j$ is the transit time of an acoustic pulse from an upstream transducer to a downstream transducer in path j;

$\Delta t_A$ is the difference in transit times between an upstream projected acoustic pulse in path i of a downstream projected pulse in path j;

$\Delta t_B$ is the difference in transit times between an upstream projected acoustic pulse in path j of a downstream projected pulse in path i; and B is a function of additional paths, if any.

8. A method of operating a multi-path flowmeter which derives fluid flow measurements, comprising the steps of:

a. simultaneously projecting acoustic pulses through said fluid in opposite directions along two different ones of said paths and deriving values related to the travel time of at least one of said pulses and the difference in travel time of said pulses;

b. subsequently repeating the above for the reverse directions to derive further values related to the travel time of at least one of the pulses and the difference in travel time of said pulses of the subsequent projection; and c. calculating fluid flow utilizing said values and further values.

9. A method according to claim 8 which additionally includes the steps of:

a. subsequently simultaneously projecting acoustic pulses through said fluid in the same direction along said two paths to derive values related to the travel time of said pulses and thereafter b. repeating the above for the reverse direction to derive still further values.

10. A multi-path flowmeter for deriving fluid flow measurements, comprising:

a. means for simultaneously projecting acoustic pulses through said fluid in opposite directions along two different ones of said paths and deriving values related to the travel time of at least one of said pulses and the difference in travel time of said pulses, b. said means being subsequently operable to project said acoustic pulses in the reverse directions to derive further values related to the travel time of at least one of the pulses and the difference in travel time of said pulses, of the subsequent projection; and c. means for calculating fluid flow utilizing said values and further values.

* * * * *